United States Patent
Aoki

(10) Patent No.: US 6,189,873 B1
(45) Date of Patent: Feb. 20, 2001

(54) VIBRATION INSULATING DEVICE

(75) Inventor: Kazushige Aoki, Tokyo (JP)

(73) Assignee: Nissan Motor Co., Ltd., Yokohama (JP)

(*) Notice: Under 35 U.S.C. 154(b), the term of this patent shall be extended for 0 days.

(21) Appl. No.: 09/450,427

(22) Filed: Nov. 30, 1999

(30) Foreign Application Priority Data

Nov. 30, 1998 (JP) .................................................. 10-339551

(51) Int. Cl.[7] .............................. F16M 1/00; F16M 5/00
(52) U.S. Cl. ............................... 267/140.14; 267/140.15
(58) Field of Search ........................ 267/140.11, 140.13, 267/140.14, 140.15; 248/550, 562

(56) References Cited

U.S. PATENT DOCUMENTS

| | | | |
|---|---|---|---|
| 5,333,846 | * 8/1994 | Goto et al. | 267/140.14 |
| 5,718,417 | * 2/1998 | Aoki | 267/140.14 |
| 5,779,231 | * 7/1998 | Okazaki et al. | 267/140.14 |
| 5,905,317 | * 5/1999 | Aoki | 267/140.14 |
| 5,947,456 | * 9/1999 | Aoki | 267/140.14 |
| 6,032,937 | * 3/2000 | Kojima et al. | 267/140.13 |

\* cited by examiner

Primary Examiner—Chris Schwartz
(74) Attorney, Agent, or Firm—Foley & Lardner

(57) ABSTRACT

A fluid sealed type vibration insulating device provided with an actuator for generating an active supporting force. The vibration insulating support device includes a main fluid chamber defined by a conical-shaped elastic support and a movable construction part. The movable construction part is constituted by a partition wall and a magnetic path member which is fastened to the partition wall through a clearance spacer. Therefore, a clearance is formed between the partition wall and the magnetic path and a plate spring is installed in the clearance to support the movable plate against the magnetic force of a permanent magnet. The partition wall has an internal thread hole to be bolted. The magnetic path has a hole with one opening diameter larger than another opening diameter for inserting a bolt. The bolt has a dish-shaped bolt head. If a center of the hole is off to the side of the center of the partition wall's hole, any edge point of the bolt head contacts any surface of the inner hole and pushes. Therefore, the center of the magnetic path member 88 is automatically put in alignment with the center of the partition wall 78A by the bolt.

6 Claims, 4 Drawing Sheets

VIBRATION INSULATING DEVICE

CROSS REFERENCE TO RELATED APPLICATIONS

The entire contents of Japanese application Tokugan Hei 10-339551, with a filing date of Nov. 30, 1998 in Japan, are hereby incorporated by reference.

BACKGROUND OF THE INVENTION

The present invention relates to a device for insulating vibrations and supporting a vibration generating means such as an engine of a vehicle, and particularly to a fluid sealed type vibration insulating device which has a fluid chamber defined by the elastic support and is arranged to sufficiently decrease a magnitude vibration input. The present invention more particularly relates to a movable plate partly defining the fluid chamber, which is displaced in the direction for changing the volume of the fluid chamber.

As one example, Japanese Patent Kokai No. 5-332392 discloses a fluid sealed type vibration insulating device which is able to generate an active supporting force. This vibration insulating device is provided with an inner cylinder fixed to one of a vibrating means and a structural member, an outer cylinder fixed to the other one of the vibrating means and the structural member while surrounding the inner cylinder, an elastic support disposed between the inner and outer cylinders, a main fluid chamber defined by the elastic support, an auxiliary fluid chamber variable in volume, an orifice communicating the main fluid chamber and the auxiliary fluid chamber, fluid sealed in the main fluid chamber, the auxiliary fluid chamber and the orifice, a movable plate displaceable in the direction for changing the volume of the main fluid chamber, and an actuator driven by the movable plate. This conventional vibration insulating device is arranged to generate a desired damping force by flowing the fluid through the orifice and to generate an active supporting force by elastically deforming an expanding directional functioning spring of the elastic support due to the displacement of the movable plate.

BRIEF SUMMARY OF THE INVENTION

It is an object of the present invention to provide a vibration insulating device which can be formed by a simplified a manufacturing process and thereby decrease the manufacturing cost.

According to one aspect of the present invention, there is provided a vibration insulating device comprising: a main fluid chamber; an elastic support partly defining the main fluid chamber; fluid filled in said main fluid chamber; a movable construction part to change the volume of said main fluid chamber; an elastic plate elastically supporting said movable construction part so that said movable plate is allowed moving; an actuator to generate a displacement force for displacing said movable construction part; wherein said movable construction part comprises: a partition wall partly defining said main fluid chamber; said partition wall having a internal thread hole; a magnetic path member to get said displacement force of said actuator; said magnetic path member having a first hole; a bolt to fasten said partition wall and said magnetic path member, said bolt being inserted in said internal thread hole and said first hole; a clearance spacer to make a clearance between said partition wall and said magnetic path; wherein said bolt comprises a bolt head on a external thread, said bolt head contacting said first hole's internal surface as the bolt is inserted; wherein said bolt head pushes said first hole's internal surface until the center of the first hole is put in agreement with the center of the internal thread hole.

There is also provided a vibration insulating device interposed between a vibrating means and a vehicle body, the vibration insulating device comprising: a main fluid chamber; an elastic support partly defining the main fluid chamber; fluid filled in said main fluid chamber; a partition wall to change the volume of said main fluid chamber, said partition wall partly defining said main fluid chamber; said partition wall being formed into a disc shape having a center axis; an actuator to generate a displacement force for displacing said partition wall toward the center axis of said partition wall, said displacement force generated as a round shape which has a center axis; a magnetic path member to transmit said displacement force to said movable plate, said magnetic path member wall being formed into a disc shape having a center axis; a clearance spacer to make clearance between said partition wall and said magnetic path member, said clearance spacer being formed into a disc shape having a center axis; a seal ring elastically connected with said movable plate so that partition wall is allowed moving, said seal ring fixing so that the center axis of said partition wall is in agreement with the center axis of said displacement force; an elastic plate elastically supporting said movable plate to generate a force according to said displacement force, said elastic plate being placed said clearance; a bolt to fasten said movable plate, magnetic path member and clearance spacer; wherein said partition wall has a internal thread hole which is in the center of said partition wall; wherein said clearance spacer has a opening to be inserted said bolt, which is in the center of said clearance spacer; wherein said magnetic path member has a first hole to inserted said bolt, which is in the center of said magnetic path; wherein said bolt comprises a bolt head on a external thread, said bolt head contacting said path's hole in its hole as the bolt is inserted; wherein said bolt head pushes said magnetic path until the center of the magnetic path is put in agreement with the center of the partition wall.

DETAIL DESCRIPTION OF THE PREFERRED EMBODIMENTS

Figure 1:
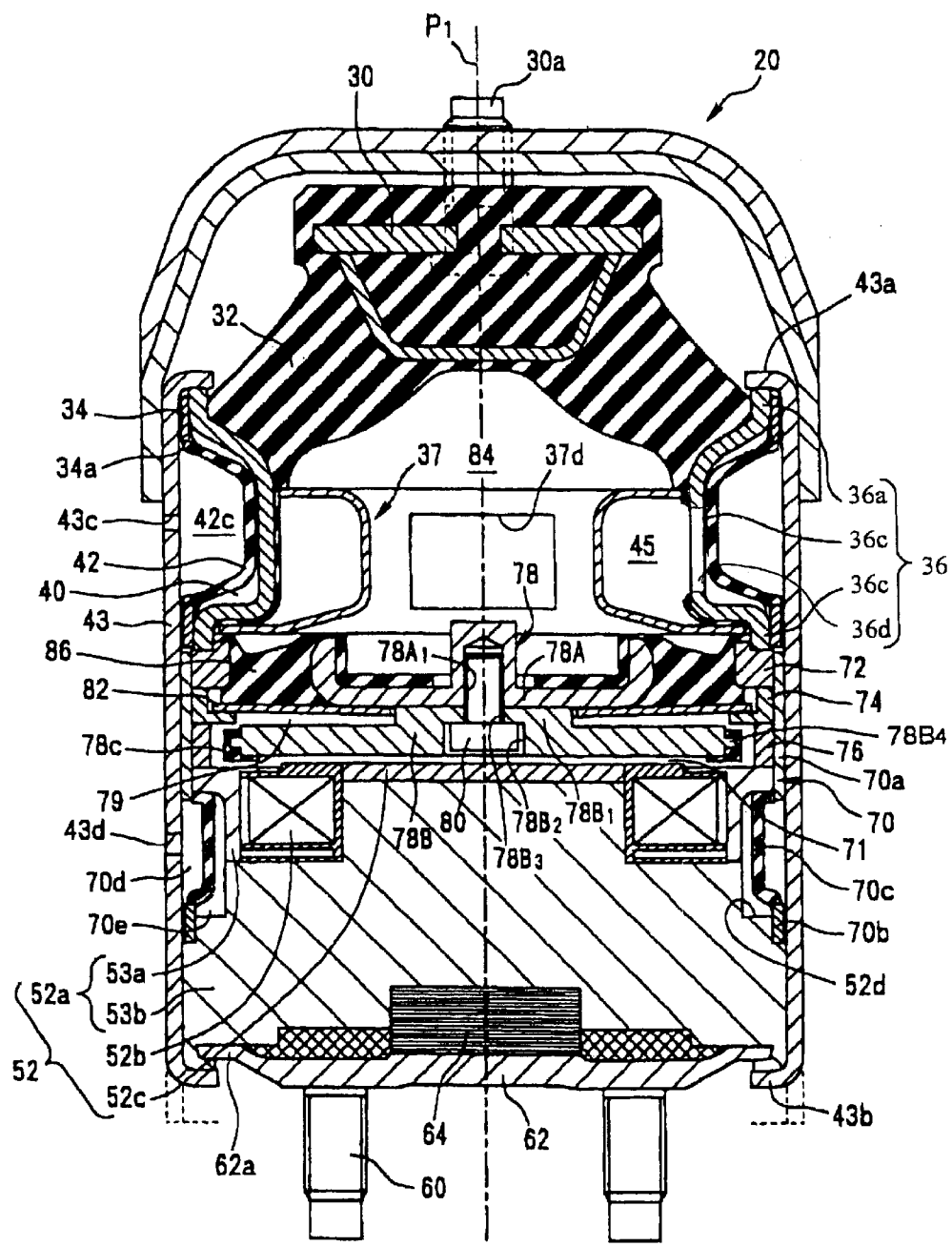
FIG. 1 is a cross-sectional view which shows a structure of a vibration insulating device which is set forth as background information for the present invention.
Figure 2:
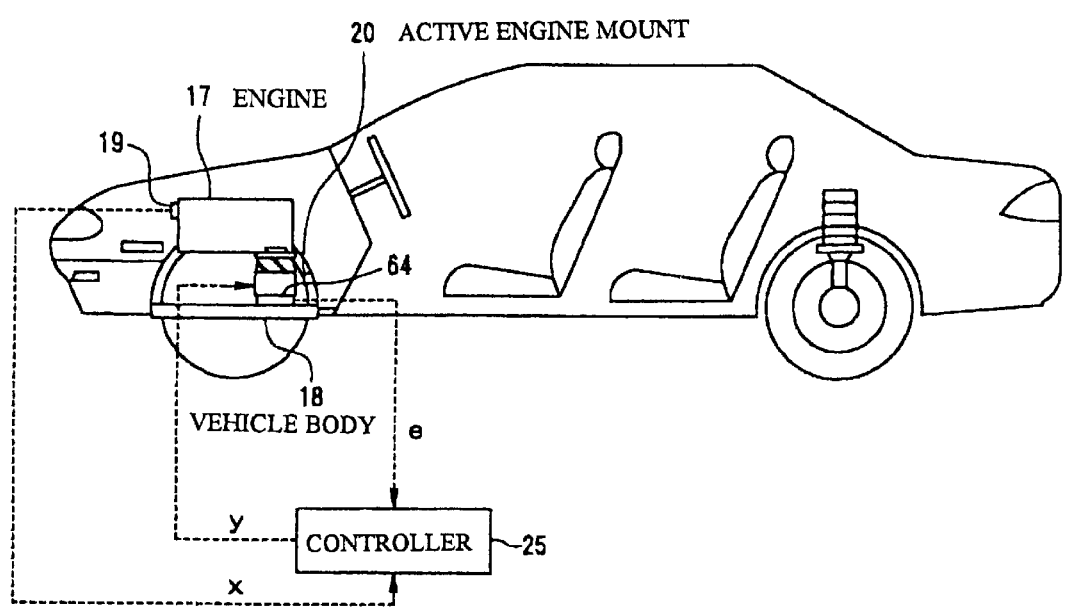
FIG. 2 is a whole structure view which shows an equipped condition which is set forth as background information for the invention.

Referring to FIGS. 1 to 2, there is shown background information of a vibration insulating device according to the present invention;

The vibration insulating device according to this embodiment is applied to a so-called active engine mount 20 which actively decreases vibrations transferred from an engine 17 to a vehicle body 18.

This engine mount 20 has a device case 43, which is formed into a cylindrical shape. Components of the vibration insulating device is installed in the device case 43 and caulked with an upper end portion 43a and a lower end portion 43b of the device case 43.

An elastic support 32 is provided on the upper of the device case 43. A structural member 30 is installed within an inner region of the elastic support 32. The structural member 30 comprises an installation bolt 30a through which the engine mount 20 is connected with the engine 17. The bolt 30a is protruded upward from the structural member 30 and is extended along a center axis P1 of the insulating device.

The elastic support 32 is conical in shape with the lower portion of the elastic support 32 spreading out below its vertex. A lower end portion of the elastic support 32 is adhered to an inner surface of an orifice construction part 36. The elastic support 32 constitutes a part of a main fluid chamber 84 and changes its elastic spring constant through a pressure in the main fluid chamber 84.

The orifice construction part 36 is formed into a cylindrical shape as a single-piece construction, which has a cylinder 36c and open round peripherals 36a and 36b formed with the same outer diameter. The cylinder 36c is formed between the open round peripheral 36a and 36b and has smaller diameter than the peripherals 36a and 36b. An outer cylinder 34 is engaged with an outer surface of the open round peripherals 36a and 36b, and is between the device case 43 and the orifice construction part 36. Openings 34a are formed around the outer cylinder 34. A diaphragm 42 made from an elastic film is adhered to an inner portion of the outer cylinder 34 so as to expand inward. Air cells 42c are formed between the diaphragm 42 and the device case 43 through the openings 34a. The air cells 42c are connected with the outside through holes 43c, which are bored into the device case 43. Furthermore, an auxiliary fluid chamber 40 is defined by the space between the diaphragm 42 and the orifice construction part 36. The auxiliary fluid chamber 40 is able to change its volume by the deformation of the diaphragm 42.

An inner cylinder 37 is provided with an inner surface of the orifice construction part 36. An orifice 45 is defined by the inner cylinder 37 and the orifice construction part 36. Fluid in the orifice 45 works to allow fluid resonance. The orifice construction part 36 has an opening 36d, which allows communication between orifice 45 and the auxiliary fluid chamber 40. The main fluid chamber 84 is defined by the elastic support 32, the inner cylinder 37, a partition wall 78A and a seal 86. An opening 37d formed on the inner cylinder 37 allows communication between the main fluid chamber 84 and the orifice 45.

That is, the orifice 45 allows communication between the main fluid chamber 84 and the auxiliary fluid chamber 40. The main fluid chamber 84, the auxiliary chamber 40 and the orifice 45 are filled with fluid such as ethylene glycol. A damping force is generated when the fluid flows between the main fluid chamber 84 and the auxiliary chamber 40 through the orifice 45.

A spacer 70 is engaged with the inner surface of the device case 43. An upper end portion of the spacer 70 contacts with the lower end portion of the outer cylinder 34. The spacer 70 is constructed by an upper cylinder 70a, a lower cylinder 70b and a diaphragm 70c made from elastic film which allows communication between said upper cylinder 70a and the lower cylinder 70b. A seal ring 72, a spring support ring 74 and a gap adjustment ring 76 are installed from top respectively in the upper cylinder 70a. The spacer 70 keeps the seal ring 72, the spring support ring 74 and the gap adjustment ring 76 in place relative to center axis P1.

A movable construction part 78 is provided in the inside of the seal ring 72, the spring support ring 74 and the gap adjustment ring 76. The movable construction part 78 is constituted by a partition wall 78A and a magnetic path member 78B which is fastened to the partition wall 78A by a bolt 80.

The partition wall 78A is formed into a disc shape with its periphery bent upward. An internal thread hole 78A1 is bored in the center and from the lower surface of the partition wall 78A. There is provided an elastic seal 86 between the partition wall's periphery and the seal ring 72. The elastic seal 86 is formed into a ring shape, where the inside is adhered to the partition wall's periphery, and where the outside is adhered to the inside of the seal ring 72. That is, the lower part of the main fluid chamber 84 is defined by the partition wall 78A and elastic seal 86. The elastic deformation of the elastic seal 86 allows the vertical motion of the partition wall 78A.

The magnetic path member 78B is formed into a disc shape of which the diameter is larger than that of the partition wall 78A. A projecting portion 78B1 is formed on the center and on the upper surface of the magnetic path member 78B. A countersink hole 78B2 is made in the center and in the lower surface of the magnetic path member 78B. A hole 78B3 is pierced in the center of the countersunk hole 78B2 and the projecting portion 78B1. The bolt 80 penetrates the hole 78B3 and fastens both of the partition wall 78A and the magnetic path member 78B as a single-piece construction. That is, a clearance 79 is formed between the partition wall 78A and the magnetic path member 78B because of the projecting portion 78B1 when the partition wall 78A and the magnetic path member 78B are assembled.

A thin circular part 78B4 is formed along the whole periphery of the magnetic path member 78B and is covered by an elastic stopper 78C. The gap adjustment ring 76 ensures space for the arrangement of the magnetic path member 78B. The upward motion of the movable construction part 78 is restricted by the collision of the elastic stopper 78C and the spring support ring 74. The downward motion of the movable construction part 78 is restricted by the collision of the elastic stopper 78C and a yoke 52a.

A plate spring 82 is formed into a disc shape, which has an opening in a central part, and is installed in the clearance 79. The outer periphery of the plate spring 82 is on top of the spring support ring 74. The inner periphery of the plate spring 82 is attached to the lower surface of the partition wall 78A. When an electrical current is not supplied to a electromagnetic actuator 52, the movable construction part 78 is displaced at a neutral position where the supporting force of the plate spring 82 and the magnetic force of a permanent magnet 52c are balanced.

The electromagnetic actuator 52 is constituted by a yoke 52a which is engaged in a lower portion of the device case 34, an exciting coil 52b which is a circular coil wound round the vertical axis in the yoke 52a, and a permanent magnet 52c which is fixed to the upper surface of the part surrounded by the exciting coil 52b.

The yoke 52a is constructed of an upper yoke 53a and a lower yoke 53b. The gap adjustment ring 76 is placed on the upper periphery surface of the upper yoke 53a. A depression 52d is made on the outer periphery surfaces of the upper yoke 53a and the lower yoke 53b. The diaphragm 70c is placed in the depression 52d.

An air cell 70d is formed between the diaphragm 70c and the device case 43. The air cell 70d is connected with the outside through holes 43d, which are bored into the device case 43. An air cell 70e is formed between the diaphragm 70c and the yoke 52a. The air cell 70e is connected with a gap space 71, which is formed between the magnetic path member 78B and yoke 52*a*. The deformation of the diaphragm 70*c* can compensate for the pressure change in the gap space 71.

The permanent magnet 52*c* is formed into a disc shape. The upper surface of the permanent magnet 52*c* faces the lower surface of the magnetic path member 78B across the gap space 71. The permanent magnet 52*c* forms a polarity in the vertical direction. Magnetic circuits are formed out as follows. The magnetic lines of force go into the magnetic path member 78B through the gap space 71. The magnetic lines of force go out from the periphery of the magnetic path member 78B and return to the yoke 51*a* through the gap space 71 and the exciting coil 52*b*.

The exciting coil 52*b* is electrically connected with a controller 25 functioning as an electromagnetic actuator controlling means through a harness. If the magnetic force generated at the exciting coil 52*b* by the electrical current is directed against the direction of the magnetic force of the permanent magnet 52*c*, the magnetic path member 78B is displaced in the direction that the clearance relative to the electromagnetic actuator 52 is increased. Conversely, if the direction of the magnetic force generated at the exciting coil 52*b* is the same as that of the magnetic force of the permanent magnet 52*c*, the magnetic path member 78B is displaced so that the clearance relative to the electromagnetic actuator 52 is decreased. As a result, the volume in the main chamber is changed. In response to the volume change a fluid flows between the main fluid chamber 84 and the auxiliary chamber 40 through the orifice 45.

A load sensor 64 is fixedly installed between the yoke 52*a* and a cover 62 as the center of the pressure sensor 64 is aligned along the center axis P1 position. A piezoelectric device, distortion gage or the like can be used as a pressure sensor. The upper portion of the pressure sensor 64 is engaged with the lower portion of the yoke 53*b*.

The cover 62 is generally formed into a disc shape. The peripheral edge 62*a* of the cover 62 is caulked with the lower end portion 43*b* of the device case 43 and the lower flange portion of the yoke 53*b*. The cover 62 comprises two installation bolts 60 through which the engine mount 20 is connected with the vehicle body 18. The pressure sensor 64 detects a vibration condition transmitted from the yoke 52*a* to the cover 62 and outputs a residual vibration signal to the controller 25.

In the case that the engine mount 20 is applied to a reciprocated four cylinder engine, the idle vibration and the booming noise vibration are mainly caused by the transmission of an engine vibration of a second component of the engine rotation through the engine mount 20 to the vehicle body 18. Accordingly, it is possible to reduce the vibration transmitting ratio by generating and outputting the drive signal upon synchronizing the signal with the secondary component of the engine rotation.

A pulse signal generator 19 is installed in the engine 17 and is electrically connected with the controller 25. The pulse signal generator 19 generates an impulse signal synchronized with the rotation of a crankshaft of the engine 17, for example, once for each 180° angle rotation of the crankshaft in the case of a reciprocated four cylinder engine, and outputs as a reference signal x. The reference signal x is supplied to the controller 25 a signal representative of a vibration generated at the engine 17.

The exciting coil 52*b* of the electromagnetic actuator 52 is electrically connected with the controller 25 functioning as an electromagnetic actuator controlling means through a harness. The exciting coil 52*b* generates a predetermined electromagnetic force according to a drive signal y which is a drive current supplied from the controller 25. The controller 25 includes a micro-computer, various interface circuits, an A/D converter, a D/A converter and an amplifier. When the controller 25 detects that the engine 17 is generating the idle vibration or high-frequency vibrations such as booming noise sound vibration, the controller 25 generates a control vibration and supplies it to the engine mount 1 so that the engine generated vibration is not transferred to the vehicle body 18. Specifically, an exciting force input to the engine mount 20 due to the vibration at the engine 30 is canceled by a controlling force generated by the electromagnetic force of the electromagnetic actuator 52.

The pressure sensor 64 detects a vibration condition of the vehicle body in the form of a pressure and outputs a residual vibration signal e. The residual vibration signal e is supplied to the controller 25 as a signal representative of a vibration after the interference by the engine mount 20.

The controller 25 generates and outputs the drive signal y on the basis of the reference signal x and the residual vibration signal e according to the synchronized Filtered-X LSM algorithm.

That is, the controller 25 includes an adaptive digital filter W which variably changes a filter coefficient Wi where I=0, 1, 2, . . . ,I−1, and I is a number of tap. From a time the newest reference signal x is input, in predetermined sampling-clock intervals, the filter coefficient Wi of the adaptive digital filter W is in turn output as a drive signal y. An appropriate updating process of the filter coefficient Wi of the adaptive digital filter W is executed according to the reference signal x and the residual vibration signal e.

An updating equation of the adaptive digital filter W is represented by the following equation (b 1) based on the Filtered-X LMS algorithm.

$$Wi(n+1)=Wi(n)-\mu R^T e(n)$$

Where a term including (n) represents a value at time n, $\mu$ is a coefficient called as a convergence coefficient, and is related to the converging speed of the filter coefficient Wi and its stability. $R^T$ is, theoretically, a Filtered-X signal obtained by filter-processing the reference signal x by means of a model transfer function filter C^ which is a model of a transfer function C between the force generated at the electromagnetic actuator 52 and the pressure sensor 64. Accordingly, in case that impulse responses of the transfer function filter C^ are in turn generated synchronized with the reference signals x, $R_T$ corresponds to the sum of these impulse response wave forms at the time n.

Theoretically, the drive signal y is generated by filtering the reference signal x by means of the adaptive digital filter W, and this filtering process corresponds to a convolution calculation in the digital calculation. Since the reference signal x is an impulse train, by outputting each filter coefficient Wi of the adaptive digital filter W as a drive signal y in turn at predetermined sampling-clock intervals from the time that the newest reference signal x is input, the same result is obtained as in the case that the result of the filter process is taken as the drive signal y.

Figure 3:
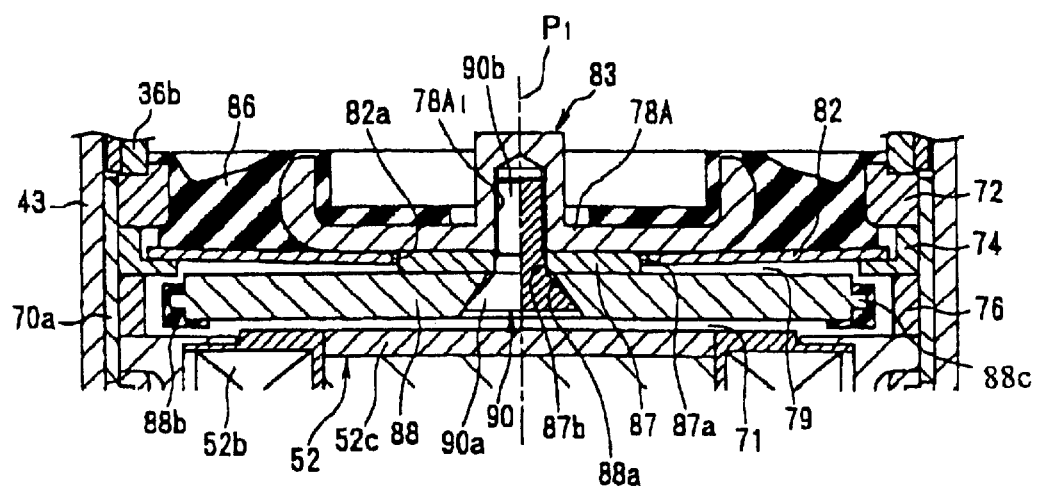
FIG. 3 is a cross-sectional view which partially shows a structure of a vibration insulating device according to the present invention.
Figure 4:
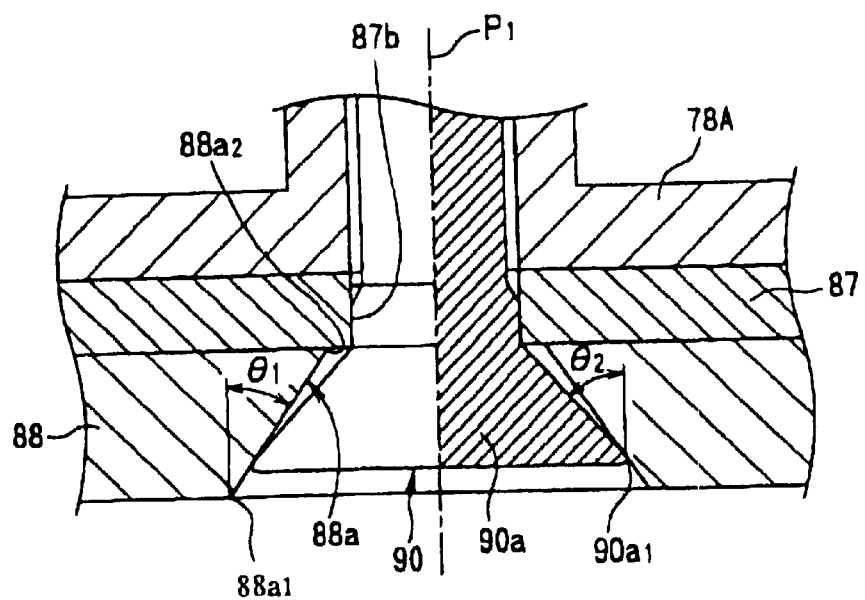
FIG. 4 is a cross-sectional view which partially shows a structure of the vibration insulating device shown in FIG. 3.

Referring now to FIGS. 3 and 4, there is shown a detailed description of a vibration insulating device according to the present invention. In these drawings, the elements which are the same as those of FIGS. 1 and 2 are designated by the same reference numerals, and a discussion of those elements is omitted.

In the present invention, a movable construction part 83 is installed in the place of the movable construction part 78.

The movable construction part 83 is constituted by the partition wall 78A and a magnetic path member 88 which is fastened to the partition wall 78A through a clearance spacer 87 by a bolt 90. The bolt 90 has a dish-shaped bolt head 90*a*. The bolt head 90*a* is molded with a bolt body 90*b* on which an external thread is formed. That is, the bolt head 90*a* has its largest outer diameter at the bolt head top, and the outer diameter of the bolt head tapers off to the bolt body 90*b*.

The clearance spacer 87 placed between the partition wall 78A and the magnetic path member 88 is formed into a disc shape, where the diameter of the member 88 is smaller than the inner diameter of the plate spring 82. The clearance spacer 87 has an opening 87*b* in a central part and the inner diameter of the opening 87*b* is slightly larger than the inner diameter of the internal thread hole 78A1. The clearance spacer 87 has a same thickness as the projecting portion 78B1 height. Therefore, the clearance 79 formed by the clearance spacer 87 has the same breadth as that formed by the projecting portion 78B1.

The magnetic path member 88 is formed into a disc shape and has a diameter is larger than the partition wall 78A. A thin circular part 88*c* is formed along the whole periphery of the magnetic path member 88 and is covered by an elastic stopper 88*b*.

A hole 88*a* is pierced in the center of the magnetic path member 88. The first opening 88*a*1 of the hole 88*a*, which faces the lower surface of the magnetic path member 88, has a larger diameter than the second opening 88*a*2 of the hole 88*a*, which faces the upper surface of the magnetic path member 88. Therefore, the inner diameter of the hole 88*a* tapers off from the first opening 88*a*1 to the second opening 88*a*2. The inner diameter of the second opening 88*a*2 is larger than the inner diameter of the opening 87*b* but is smaller than the largest outer diameter of the head 90*a*.

In this embodiment, a acute angle to the center axis P1 of the bolt head 90*a* surface and the hole 88*a* surface is defined as a taper angle. The bolt head taper angle $\theta 2$ is set larger than the hole taper angle $\theta 1$.

The movable construction part 83 can be assembled, for example, according to the following process. First, the partition wall 78A is upended. That is, the internal thread hole 78A1 is faced upward. At this time, the seal ring 72 and the elastic seal 86 have already been assembled with the partition wall 78A as a single-piece construction. Then, the clearance spacer 87 on the partition wall 78A is placed so as to put the opening 87*b* in agreement with the internal thread hole 78A1, and the plate spring 82 is placed on the partition wall 78A. Next, the magnetic path member 88 on the partition wall 78A is placed so as to put the second opening 88*a*2 in alignment with the opening 87*b*. Lastly, the bolt 90 is fastened in the internal thread hole 78A1 through the magnetic path member 88 and the clearance spacer 87.

If a center of the hole 88*a* is off to the relative to the center of the internal hole 78A1, any edge point of the bolt head 90*a* contacts any surface of the inner hole 88*a* as the bolt 90 is inserted. To put it more precisely, the edge point of the bolt head 90*a* contacts the surface point of the inner hole 88*a* which is closest to the center of the internal hole 78A1. As the bolt 90 is inserted still more, the edge point of the head 90*a* pushes the closest surface point of the inner hole 88*a* so as to move the closest surface point of the inner hole 88*a* away from the center of the internal hole 78A1. That is, the center of the magnetic path member 88 is automatically put in alignment with the center of the partition wall 78A. Consequently, the center of the magnetic path member 88 is put in alignment with the center axis P1 and the magnetic force of the permanent magnet 52*c* works uniformly to the magnetic path member 88.

The movable construction part 83 assembled as discussed above is installed in the device case 43 according to following process.

The gap adjustment ring 76 is placed on the yoke 52*a*. Then the spring support ring 74 is placed on the gap adjustment ring 76. The seal ring 72 is placed on the support ring 74. At this time, the seal ring 72 is placed on the spring support and is bent against the magnetic force of the permanent magnet 52*c*. So the magnetic path member 83 is displaced at a neutral position where the supporting force of the plate spring 82 and the magnetic force of the permanent magnet 52*c* are balanced. When the gap space 71 is not proper, it is easily adjusted to a desired value by changing the gap adjustment ring 76.

In this present embodiment, the outer diameter of the bolt head is set smaller than the inner diameter of the first opening 88*a*1, and the outer diameter of the bolt head is set larger than the inner diameter of the second opening 88*a*2. Therefore, the edge point of the bolt head 90*a* contacts the surface point of the inner hole 88*a* as the bolt 90 is inserted. However, the bolt head taper angle $\theta 2$ may be set to the same angle as the hole taper angle $\theta 1$. In this case, the surface line of the bolt head 90*a* contacts the surface point of the inner hole 88*a* as the bolt 90 is inserted.

Furthermore, the clearance space 87 and the magnetic path member 88 are formed as a flat plate. For example, they can be simply made from a press process. Thus the manufacturing process can be more shorter than for molding the magnetic path member 78B with the projecting portion 78B1 on it as one piece. Therefore, the manufacturing process can be simplified and the manufacturing cost decreased.

What is claimed is:

1. A vibration insulating device interposed between an engine and a vehicle body, the vibration insulating device comprising:
    a main fluid chamber;
    an elastic support partly defining the main fluid chamber;
    a movable construction part for changing a volume of said main fluid chamber;
    an actuator to generate a displacement force for displacing said movable construction part;
    an elastic plate elastically supporting said movable construction to generate a force according to said displacement force,
    wherein said movable construction part includes
        a partition wall partly defining said main fluid chamber, said partition wall having an internal thread hole;
        a magnetic path member to receive said displacement force of said actuator, said magnetic path member having a first hole;
        a bolt to fasten said partition wall and said magnetic path member, said bolt being inserted in said internal thread hole and said first hole;
        a clearance spacer for making a clearance between said partition wall and said magnetic path member;
        wherein said bolt comprises a bolt head on an external thread, said bolt head contacting said first hole's internal surface as the bolt is inserted;
        wherein said bolt head pushes said first hole's internal surface until the center of the first hole is put in alignment with the center of the internal thread hole,
        wherein said first hole has a first opening and a second opening on the respective surfaces of said magnetic path member;
        wherein said first hole has an inner diameter which tapers off from the first opening to the second opening with a taper angle $\theta 1$;

wherein said bolt head has an outer diameter which tapers off from the top of the head of the external thread with a taper angle θ2;

wherein the taper angle θ2 is at least the same or larger than the taper angle θ1.

2. A vibration insulating device as claimed in claim 1, wherein said outer diameter of said bolt head is smaller than an inner diameter of said first opening, and wherein said outer diameter of said bolt head is larger than an inner diameter of said second opening.

3. A vibration insulating device as claimed in claim 1, wherein said partition wall is formed into a disc shape which has a center axis, said magnetic path member is formed into a disc shape which has a center axis, said clearance spacer is formed into a disc shape which has a center axis, all of the center axes of said partition wall, said magnetic path member and said clearance spacer are put in alignment by said bolt.

4. A vibration insulating device interposed between an engine and a vehicle body, the vibration insulating device comprising:

a main fluid chamber;

an elastic support partly defining the main fluid chamber;

a partition wall for changing a volume of said main fluid chamber, said partition wall partly defining said main fluid chamber, said partition wall being formed into a disc shape having a center axis;

an actuator for generating a displacement force for displacing said partition wall toward the center axis of said partition wall;

a magnetic path member for transmitting said displacement force to said partition wall, a magnetic path member wall of said magnetic path member being formed into a disc shape having a center axis;

a clearance spacer for making clearance between said partition wall and said magnetic path member, said clearance spacer being formed into a disc shape having a center axis;

a seal ring elastically connected with said partition wall so that said partition wall is allowed to move, said seal ring fixed so that the center axis of said partition wall is in alignment with the center axis of said displacement force;

an elastic plate elastically supporting said partition wall to generate a force according to said displacement force, said elastic plate being placed within said clearance;

a bolt for fastening said partition wall, magnetic path member and clearance spacer;

wherein said partition wall has an internal thread hole which is in the center of said partition wall;

wherein said clearance spacer has an opening for inserting said bolt, where said opening is in the center of said clearance spacer;

wherein said magnetic path member has a first hole for inserting said bolt, where said first hole is in the center of said magnetic path member;

wherein said bolt comprises a bolt head on an external thread, said bolt head contacting said first hole as the bolt is inserted;

wherein said bolt head pushes said magnetic path member in the first hole until the center of the magnetic path member is put in alignment with the center of the partition wall, wherein said first hole has a first opening and a second opening on the respective surfaces of said magnetic path member;

wherein said first hole has an inner diameter which tapers off from the first opening to the second opening with a taper angle θ1;

wherein said bolt head has an outer diameter which tapers off from the top of the head to the external thread with a taper angle θ2;

wherein the taper angle θ2 is at least the same or larger than the taper angle θ1.

5. A vibration insulating device as claimed in claim 4, wherein said outer diameter of said bolt head is smaller than an inner diameter of said first opening, and wherein said outer diameter of said bolt head is larger than an inner diameter of said second opening.

6. A movable construction part for use in a vibration insulating device interposed between an engine and a vehicle body, the movable construction part comprising:

a partition wall at least partly defining a main fluid chamber, said partition wall having an internal thread hole;

a magnetic path member to receive a displacement force of an actuator, said magnetic path member having a first hole;

a bolt to fasten said partition wall and said magnetic path member, said bolt being inserted in said internal thread hole and said first hole;

wherein said bolt comprises a bolt head on an external thread, said bolt head contacting said first hole's internal surface as the bolt is inserted;

wherein said bolt head pushes said first hole's internal surface until the center of the first hole is put in alignment with the center of the internal thread hole;

wherein said first hole has an inner diameter which tapers off from the first opening to the second opening with a taper angle θ1;

wherein said bolt head has an outer diameter which tapers off from the top of the head of the external thread with a taper angle θ2;

wherein the taper angle θ2 is at least the same or larger than the taper angle θ1.

* * * * *